(12) United States Patent
Kaeb et al.

(10) Patent No.: US 10,729,060 B2
(45) Date of Patent: Aug. 4, 2020

(54) SEED FLOW CHAMBER FOR SEED CONDITIONING, PROCESSING, AND DRYING IN A TREATMENT SYSTEM

(71) Applicant: KSi Conveyor, Inc., Sabetha, KS (US)

(72) Inventors: Paul A. Kaeb, Sabetha, KS (US); Matthew J. Edelman, Sabetha, KS (US)

(73) Assignee: KSi Conveyor, Inc., Sabetha, KS (US)

( * ) Notice: Subject to any disclaimer, the term of this patent is extended or adjusted under 35 U.S.C. 154(b) by 477 days.

(21) Appl. No.: 15/493,924

(22) Filed: Apr. 21, 2017

(65) Prior Publication Data

US 2018/0124994 A1 May 10, 2018

Related U.S. Application Data

(60) Provisional application No. 62/419,757, filed on Nov. 9, 2016.

(51) Int. Cl.
*A01C 1/00* (2006.01)
*A01C 1/06* (2006.01)
(Continued)

(52) U.S. Cl.
CPC .............. *A01C 1/00* (2013.01); *A01C 1/06* (2013.01); *F26B 17/1433* (2013.01);
(Continued)

(58) Field of Classification Search
CPC ... A01C 1/00; A01C 1/06; F26B 25/12; F26B 25/002; F26B 25/001; F26B 17/1433;
(Continued)

(56) References Cited

U.S. PATENT DOCUMENTS

| 2,561,394 A | 7/1951 | Marshall |
| 3,052,990 A | 9/1962 | Tailor |

(Continued)

FOREIGN PATENT DOCUMENTS

| CN | 1103046 A | 5/1995 |
| CN | 101193810 A | 6/2008 |
| DE | 102012209435 A1 | 12/2013 |

OTHER PUBLICATIONS

Bean Ladder—Cushion Flow.
(Continued)

*Primary Examiner* — Trinh T Nguyen
(74) *Attorney, Agent, or Firm* — Coughlin Law Office LLC; Daniel J. Coughlin (57) ABSTRACT

A seed flow chamber for handling seed and grain commodity, especially for use with a seed treatment applicator. Seed flow is received through an upper inlet opening configured to receive a flow of seed and discharged through a lower discharge opening. A diverging guide member splits the seed flow. A converging guide member disposed below the diverging guide member reunites the seed flow prior to discharge. The converging member has a downward sloping surface and an air vent, such as a plurality of airflow apertures connected to a plenum. The air vent is configured to communicate with an air supply. A vacuum vent—disposed below the diverging guide member—is configured to communicate with a vacuum source. A fan system recirculates air between the air vent and the vacuum vent. Dehumidifier may condition the air supply to assist with drying.

10 Claims, 8 Drawing Sheets

(51) Int. Cl.
*F26B 21/04* (2006.01)
*F26B 21/00* (2006.01)
*F26B 25/12* (2006.01)
*F26B 17/14* (2006.01)
*F26B 21/08* (2006.01)

(52) U.S. Cl.
CPC ............ *F26B 21/004* (2013.01); *F26B 21/04* (2013.01); *F26B 21/08* (2013.01); *F26B 25/12* (2013.01)

(58) Field of Classification Search
CPC .......... F26B 21/02; F26B 21/04; F26B 17/12; F26B 17/124; F26B 17/128
USPC .................................. 34/165, 167, 169, 175
See application file for complete search history.

(56) References Cited

U.S. PATENT DOCUMENTS

| | | | |
|---|---|---|---|
| 3,111,483 A | | 11/1963 | John |
| 3,306,443 A | * | 2/1967 | Sereno et al. ............ B02B 1/02 209/136 |
| 3,655,043 A | * | 4/1972 | Wochnowski ............ A24B 5/10 209/138 |
| 4,117,801 A | | 10/1978 | Dannelly et al. |
| 4,658,992 A | | 4/1987 | Peleus |
| 4,865,721 A | | 9/1989 | Smith et al. |
| 4,931,173 A | | 6/1990 | Lesher |
| 5,685,434 A | | 11/1997 | Ackerman |
| 6,283,301 B1 | | 9/2001 | Pedersen |
| 6,405,405 B1 | | 6/2002 | Hauch |
| 6,889,843 B1 | | 5/2005 | Longhurst et al. |
| 7,712,611 B2 | | 5/2010 | Longhurst et al. |
| 8,376,663 B2 | | 2/2013 | Erceg et al. |
| 9,085,014 B2 | | 7/2015 | Ernst |
| 2008/0209755 A1 | * | 9/2008 | Shivvers ................. F26B 11/04 34/363 |
| 2012/0137391 A1 | | 5/2012 | Davis et al. |
| 2014/0027011 A1 | | 1/2014 | Bahr et al. |
| 2015/0210603 A1 | * | 7/2015 | Du ........................ C05G 3/0029 71/28 |
| 2016/0029549 A1 | | 2/2016 | Dammen et al. |
| 2016/0368721 A1 | | 12/2016 | Haraway et al. |

OTHER PUBLICATIONS

Brock, Gravity Grain Cleaner, Ultra Clean, 2 pages.
CFCAI, Cleaners Marot, 2 pages.
Cimbria Manufacturing, Cimbria Drum Scalper Type DS-1250, Data Sheet 150, Denmark.
Cimbria Manufacturing, Rotoclean Rubble Separator 149, Data Sheet 149, Denmark.
Farm Show Magazine, Cushioned Seed Ladder Stops Crop Damage, vol. 33, Issue 4, p. 27, 2009, Lakeville, Minnesota.
Goetz, Bean Ladders—RBH Mill & Elevator, 4 Pages.
GSI, Material Handling Gravity Screeners, Jul. 2015, 8 pages.
Jacob's Manufacturing, Bin Ladders, 2 pages.
Kongskilde Industries, Cleaning, Kongskilde Dual Cleaner and Aspirators, 8 pages.
Lambton Conveyor Limited, Ultra Clean Installation and Operation Manual, Feb. 19, 2013, 20 pages, Wallaceburg, Ontario, Canada.
Petkus, Product Treating, Chemical Continuous Treater, 2016, 3 pages.
Warren Richardson, Seed Preparation and Seed Treatment Application, 8 pages.
Zanin, Cleaners, agroindustrial plants.
Zanin, PPR Rotary Pre-Cleaner, 2 pages.
International Search Report PCT/US 17/28816, Authorized Office Lee W. Young, dated Aug. 1, 2017.

* cited by examiner

Fig. 8

US 10,729,060 B2

SEED FLOW CHAMBER FOR SEED CONDITIONING, PROCESSING, AND DRYING IN A TREATMENT SYSTEM

CROSS REFERENCES

This application claims the benefit of U.S. Provisional Application No. 62/385,342, filed on Sep. 9, 2016, and U.S. Provisional Application No. 62/419,757, filed on Nov. 9, 2016.

REFERENCE TO CDS

Not Applicable.

FIELD OF THE INVENTION

The present disclosure relates to the technical field of handling and treating seed commodities. Particularly, removing dust and debris from seed prior to application of a seed treatment fluid and the mixing, polishing, and drying of treated seeds.

BACKGROUND

Agricultural seeds are often treated with agrochemicals such as insecticides, fungicides, inoculants, and other compositions before planting. The time window for planting—when the weather is warm enough and the fields are dry—is often very short. This means the seed dealer must quickly treat and deliver a high volume of seed to farmers who are ready to plant their fields. These seed treatments are commonly applied by spraying a liquid composition to the surface of seed, which requires a smaller quantity of seed treatment composition than the traditional field application of treatment fluids.

However, seeds may contain dust and debris that interferes with modern seed handling and planting equipment. The dust and debris often contains portions of seed hulls, the outer shell or coating of a seed.

The last stage of treating seeds involves placing the wet, freshly treated seed in a rotating drum that mixes the treated seed, evenly distributes the treatment coat, and allows the treatment solution to dry.

SUMMARY

We disclose a seed flow chamber with an air handling system can be used in multiple stages of the seed treatment process, such as seed conditioning, processing, and drying. In general, the seed flow chamber uses a divider to divide the seed into distinct seed flow streams. Each seed flow stream falls downward. Each seed flow stream then encounters a deflector that recombines the distinct seed flow streams into a single seed flow stream. The dividing, falling, and recombining occur within the compact chamber of the seed flow chamber. This division and recombination allows for mixing and polishing the seed. The falling and recombining allows for the introduction of a pressurized airflow to remove dust and debris from the seed.

We discovered that this seed flow chamber can be used as a modular unit to multiple the beneficial effects of the seed flow chamber. Multiple seed flow chambers can be stacked vertically. A conveyor—such as a belt conveyor, elevator, or auger—is used to lift the seed to the seed inlet opening at the top of the seed flow chamber. The seed then flows under the force of gravity through the vertically stacked seed flow chambers.

We also discovered that the seed flow chamber can be used as a seed conditioner unit for removing dust and debris prior to application of seed treatment. Existing seed treatment application systems receive the flow of seed and apply the agrochemical seed treatment to the seed as delivered. As a seed conditioner, the seed flow chamber is positioned upstream of the seed treatment applicator. A source of pressurized air is introduced into the seed flow chamber and removed through a vacuum port.

We discovered that the removal of dust and debris could be optimized by creating a stream of air that moved through the seed flow chamber. In one embodiment, the flow of air is optimized by flowing generally perpendicular to the flow of the seed. Introducing the airflow at an angle generally perpendicular to the seed flow increases the amount of dust and debris removed from the seed.

We also discovered that the seed conditioner could use recycled air to provide both a source of pressurized air and a vacuum. A filtered fan system is connected with the appropriate ductwork to generate a positive pressurized air in the seed flow chamber. A vacuum is applied to vacuum ports under the deflector. The pressurized air is directed through each seed flow stream, blowing the debris out of the seed flow stream. The vacuum removes the dust and debris from the seed flow chamber, without introducing the dust and debris into the surrounding atmosphere. The ductwork connects the vacuum port to a filter system, to collect the dust. A momentary on-off cycle of the vacuum pressure releases the dust into a collection drum.

We also discovered that releasing a portion of the positive pressure in the recycled air system creates a negative pressure vacuum within the seed flow chamber. Dust and debris are restricted to exiting the flow chamber through the vacuum port by releasing about 10% of the pressurized, filtered air into the atmosphere. This produces a small net negative pressure within the seed conditioner unit.

Some of the advantage of the seed conditioner is that it:
a. Removes dust and seed particulates, specifically seed hulls before agrochemical is applied to seed commodities;
b. Prevents treatment being applied to particulates;
c. Prevents plugging up of treating equipment or planting equipment;
d. Limits wasted seed treatment fluids; and
e. Prevents treated dust particles from entering the environment.

We discovered that we could reduce the extended processing time for wet, sticky, freshly treated seed in a mixing and drying drum by using the seed flow chamber as a seed processing system. In the seed processing system, multiple modular seed flow chambers are vertically stacked downstream of the seed treatment applicator chamber.

The seed processing system can be arranged in a similar manner to the *Rapid Cleanout Mixing Drum with Multiple Functional Zones* as described in U.S. patent application Ser. No. 14/301,404 by Terry N. Kaeb on Jun. 11, 2014. For example, the seed processing system can use three vertically stacked seed flow chambers. The top seed flow chamber performs the advance mixing function to distribute the seed treatment into an even coat by rubbing the individual seeds of the seed flow stream together. The middle seed flow chamber performs the gentle conditioning stage. In the gentle conditioning stage, the seeds receiving a polished, finished coating through the mixing recombining action of the seed flow chamber. In the bottom seed flow stream, the seed flow stream is again divided and recombined to dry the seed coating.

We also discovered that recycled, conditioned, or recycled and conditioned air can be introduced to aid in the drying or mixing stages of the seed processing system. Using recycled air that passes through a filter prevents remaining dust particles that have had a seed treatment applied from entering the atmosphere or user environment. Odors from the seed treatment application may also be limited by filtering the recycled air. The conditioned air can be used to increase the efficiency of drying the seed.

Some advantage of the seed processing system may include:
a. More efficient mixing and drying of wet, freshly treated seed than exclusively using a mixing and drying drum;
b. Seed processing system occupies less floor space than a mixing and drying drum;
c. Lower power requirements than a mixing drying drum, as seed flows under the force of gravity; and
d. Seed processing system provides better and more efficient air control, which is especially useful for using conditioned during high humidity seed treating season in the spring.

Located downstream of the mixing and drying drum and the seed processing system, if any, the seed flow chamber can also act as a seed drying system. The seed drying system incorporates a conditioned air source to accelerate the drying rate of the treated seed. For example, an evaporator coil can be included in a pressurized air stream. The evaporator coil produces conditioned, dryer air that is more efficient at drying the treated seed. The seed drying system can comprise multiple modular seed flow chambers with the appropriate ductwork to introduce the conditioned air into one or more of the seed flow chambers. Using multiple, vertically stacked seed flow chambers increases the seed flow stream retention time and increases the drying capacity of the seed drying system. By using recycled air, the seed drying system can efficiently dry the treated seed while preventing seed treatment chemical and dust from entering the atmosphere.

Some advantage of the seed drying system may include:
a. More flowable seed, less sticky before entering containers;
b. More complete drying than exclusively using a mixing and drying drum;
c. Operation is quieter than other solutions to conditioning seed, such as vibrator on a box; and
d. The seed drying system is faster than other solutions. For example, using a staging hopper can take up to 10 minutes compared with between 35-40 seconds in a vertically stacked seed drying system.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

BRIEF DESCRIPTION OF DRAWINGS

Aspects are illustrated by way of example, and not by way of limitation, in the accompanying drawings, wherein.

DETAILED DESCRIPTION

As noted above, numerous problems with existing solutions for treating, mixing, drying, and conditioning within the seed treatment process can be solved by the use of a seed flow chamber.

Figure 1:
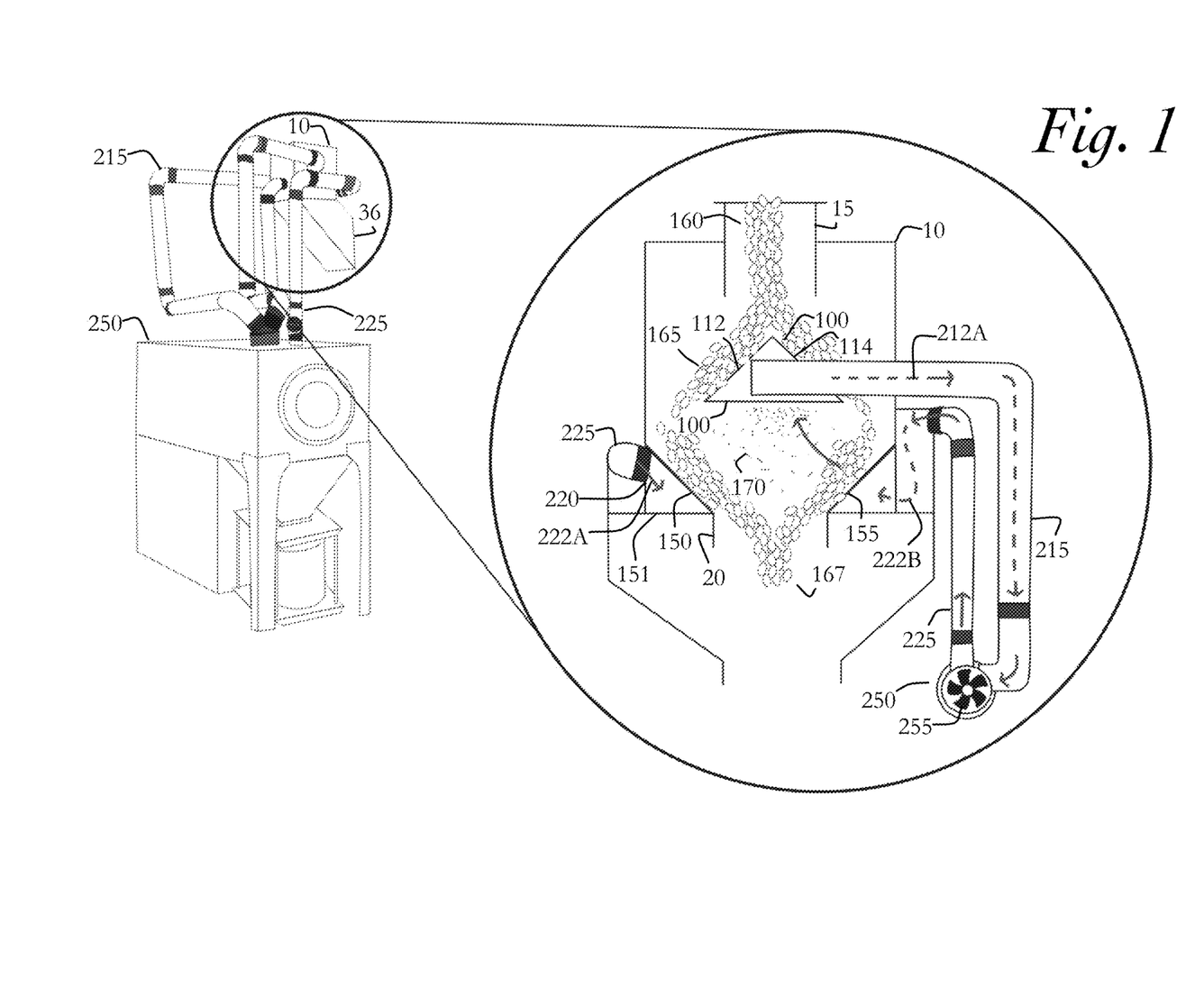
FIG. 1 depicts an embodiment of the seed flow chamber connected to the fan system with ductwork, and an enlarged cross section view of the flow chamber with seed flowing downward and dust and debris being removed.

As shown in FIG. 1, the seed flow chamber 10 divides a single seed flow stream 160 into multiple distinct seed flow streams 165, which are then recombined into a single mixed seed flow stream 167. The single seed flow stream 160 enters the seed flow chamber 10 through the seed inlet 15. The seed can be delivered to the seed flow chamber 10 by a conveyor, such as a belt conveyor, auger, or elevator. Alternatively, the seed can flow by force of gravity directly out of a box or hopper positioned above the seed flow chamber 10.

In order to divide the single seed flow stream 160 into a divided seed flow stream 165, a seed divider 100 is mounted within the seed flow chamber 10. As illustrated in FIG. 1, the seed divider 100 has a generally V-shaped cross section. Alternative cross sections for the seed divider 100 could be U-shaped or otherwise arcuate.

Each side of the seed divider 100 has a downwardly sloping wall, to direct a portion of seed to a first side of the seed flow chamber and a second portion of seed to a second side of the seed flow chamber. As shown in FIG. 1, the seed divider 100 has a first downwardly sloping wall 112 and a second downwardly sloping wall 114.

Figure 2:
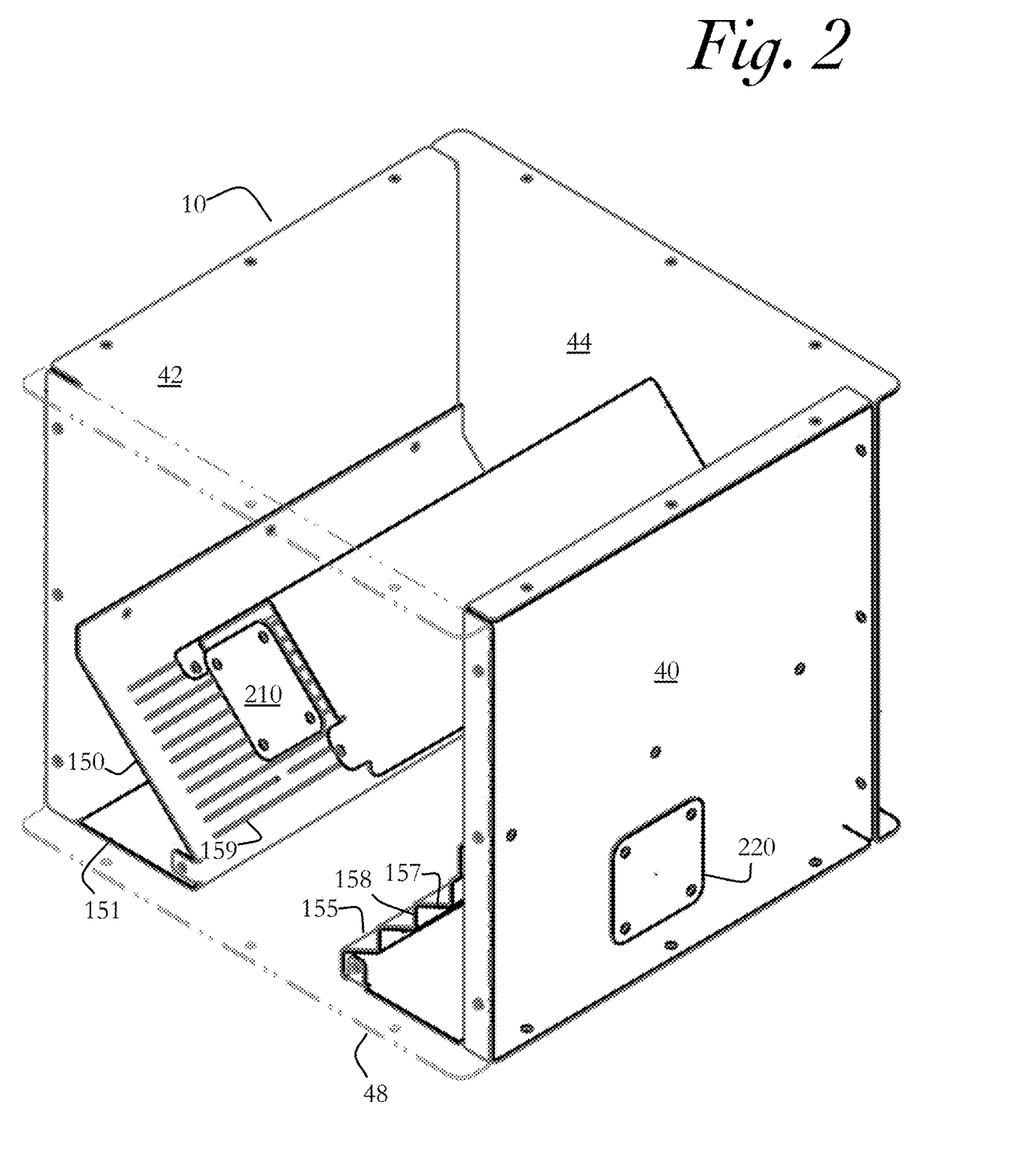
FIG. 2 depicts a topside perspective view of a seed flow chamber with the third sidewall shown as transparent.

Once divided, the divided seed flow stream 165 falls under the force of gravity until contacting a seed deflector 150, 155. As illustrated in FIG. 1, the divided stream may contact either the first seed deflector 150 or the second seed deflector 155. The first and second seed deflectors 150, 155 redirect the divided seed flow stream 165 into a single mixed seed flow stream 167. The first seed deflector 150 is illustrated in FIG. 2 as being straight, and inwardly and downwardly angled. The second seed deflector 155 is illustrated in FIG. 2 as being stepped. In the stepped embodiment, the second seed deflector 155 has sloped portions 157 that are sloping downwardly and inwardly with vertical portions 158 between the sloped portions. The single mixed seed flow stream 167 discharges under the flow of gravity through the seed discharge 20. As shown in FIG. 1, the seed deflectors 150, 155 may have an angle of 45 degrees relative to horizontal. After exiting the seed flow chamber 10 through the discharge opening 20, the seed flow may be further director by a chute 36.

Figure 3:
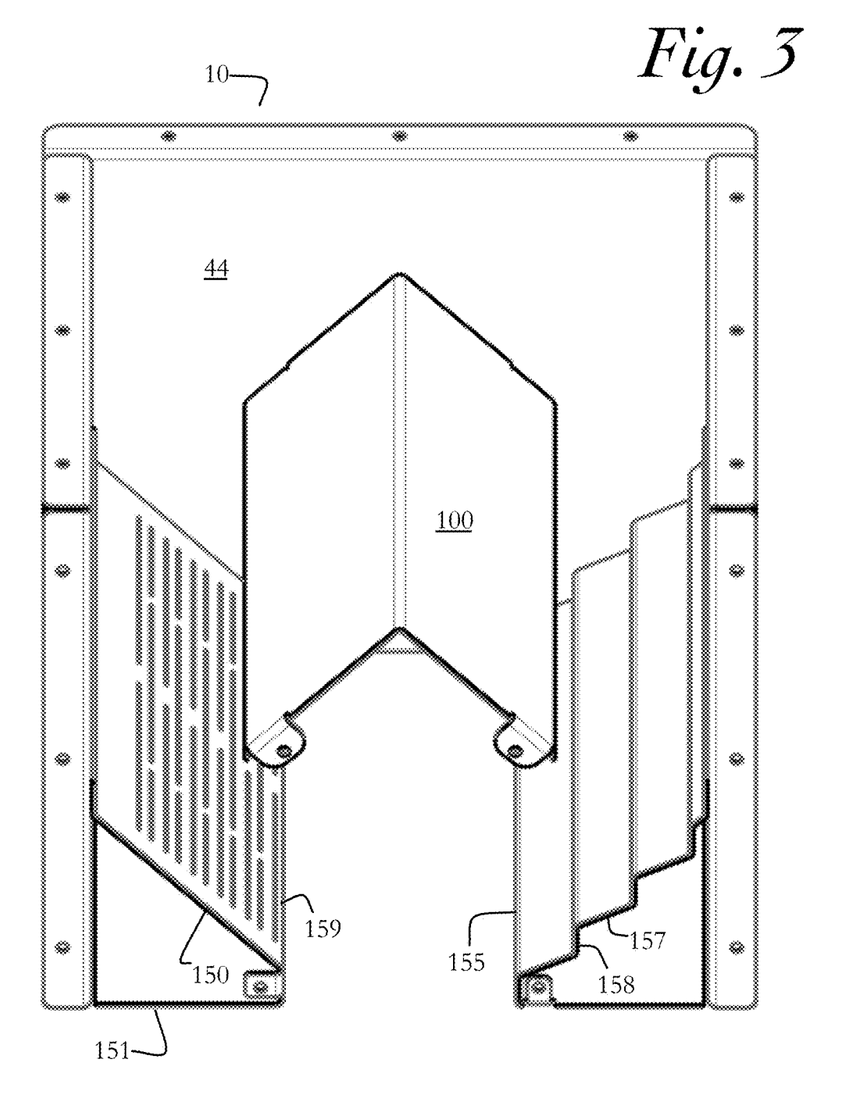
FIG. 3 shows a topside perspective view of a seed flow chamber with the third sidewall shown as transparent.

As shown in FIG. 1, the seed flow chamber 10 can be connected to a fan system 250 to provide air flow through the seed flow chamber in order to clean or dry the seed. In order to introduce the pressurized air into the seed flow chamber 10, the seed deflector 150, 155 can be perforated as shown in FIGS. 2 and 3. The perforated seed deflectors 150, 155 have a plurality of airflow apertures 159 through the seed deflectors. These airflow apertures are configured in a size, shape, and distribution to allow sufficient flow of air through the seed flow chamber 10. In one embodiment, the airflow apertures 159 are smaller than the diameter of the seed. The size of the airflow apertures 159 can be adjusted based on the seed type or seed size, to achieve sufficient airflow without allowing seed to pass through the airflow aperture. As shown in FIG. 3, the airflow apertures 159 can be extended apertures that stretch across the surface of the seed deflector 150. Alternatively, the airflow apertures 159 can be disposed in the vertical portion 158 of seed deflector 155.

The positive pressure side of the fan system 250 is connected to the seed flow chamber 10 to provide pressurized air through a pressurized air ductwork 225 through a pressurized air port 220 into the seed flow chamber, as illustrated in FIG. 1. The flow of the pressurized air is shown by arrows 222A and 222B. The pressurized air port can be configured to deliver the air through a plenum 151 in the seed deflector 150, 155 as shown in FIG. 1. The plenum 151 is in communication with the air supply through the pressurized air port 220. The pressurized air exits the plenum 151 through the air vent, such as the airflow apertures 159.

The negative pressure side of the fan system 250 is connected to the seed flow chamber 10 to provide vacuum pressure through a vacuum ductwork 215 through a vacuum air port 210 in the seed flow chamber, as illustrated in FIG. 1. The vacuum air port 210 can be connected to a separate vacuum vent (not shown) or the vent can be the same as the vacuum air port. The flow of the vacuum pressure is shown by arrow 212A. In the embodiment shown in FIG. 2, the seed flow chamber 10 has two pressurized air ports 220 (the second pressurized air port is not shown in the Figure). The two pressurized air ports 220 are disposed on opposing walls of the seed flow chamber 10. The seed flow chamber 10 embodiment of FIG. 2 also has two vacuum ports 210 (the second vacuum port is not shown in the Figure). The two vacuum ports 210 are disposed on opposing walls of the seed flow chamber 10. Additionally, the vacuum port 210 or vacuum vents can include a screen or filter to regulate the particle size that can exit the seed flow chamber 10 through the vacuum port 210 or vacuum vent.

FIG. 2 shows the seed flow chamber is illustrated as a box having four sidewalls: a first sidewall, a second sidewall, a third sidewall, and a fourth sidewall. A first inlet port and a second inlet port in opposing sidewalls. The processing chamber. The first sidewall has a first pressurized air inlet port. The first pressurized air inlet port, located at the first side of the aspirator chamber. Additional embodiments of the seed flow chamber 10 include curved or polygonal cross section.

Referring to the seed flow chamber 10 as illustrated in FIG. 2, the seed flow chamber 10 has a first sidewall 40 having a pressurized air port 220. The second pressurized air port 220 is located at a second side of the aspirator chamber. Specifically in FIG. 2, the second pressurized air port 220 is located in the second sidewall 42. A first vacuum port 210 is disposed in a third sidewall 44, for removal of a portion of the dust and debris 170. A second vacuum port 210 is disposed in a fourth sidewall (shown as transparent in FIG. 2), for removal of a portion of the dust and debris 170. The seed flow chamber 10 has an upper wall (not shown) that has a seed inlet opening 15. The lower wall 48 has a central aperture defining a seed discharge 20. The seed divider 100 is an inverted v-shaped flow divider extending from the third sidewall to the fourth side wall. The first seed deflector 150 is perforated and positioned lower than the flow divider. The first seed deflector 150 is mounted to the second sidewall 42 of the seed flow chamber at an angle that is downwardly slanted toward the center of the seed flow chamber. As illustrated, the angle of the first seed deflector 150 is 45 degrees relative to horizontal. The first seed deflector 150 extends between the third sidewall 44 and the forth sidewall 46. Being downwardly slanted, the first seed deflector 150 has an upper portion near the second sidewall 42 and a lower portion near the seed discharge 20 of the lower wall. A second seed deflector 155 is positioned below the seed divider 100. The second seed deflector 155 is mounted to the first sidewall 40 of the seed flow chamber at an angle that is downwardly slanted toward the center of the seed flow chamber. The second seed deflector extends between the third sidewall 44 and the forth sidewall 46. Being downwardly slanted, the second seed deflector 155 has an upper portion near the first sidewall 40 and a lower portion near the seed discharge 20 of the lower wall.

Referring to FIGS. 2 and 3, the airflow through the seed deflectors 150, 155 varies depending on the configuration of the seed deflector. The first seed deflector 150 is shown as straight and inwardly and downwardly angled. The airflow apertures 159 are shown as elongated apertures that extend longitudinally across the angled face of the first seed deflector 150. The pressurized air enters the seed flow path through the seed flow stream, rather than with the seed flow (such as an air conveyor) or against the seed flow (thereby disrupting the seed flow). The airflow path 222 passes through the seed flow stream at an angle approximately perpendicular to the seed flow path. As such, the dust and debris 170 is blown out of the seed flow stream and toward the vacuum port 210. The vacuum port 210 is located below the seed divider 100, which prevents seed from being vacuumed out of the seed flow chamber 10.

Figure 4:
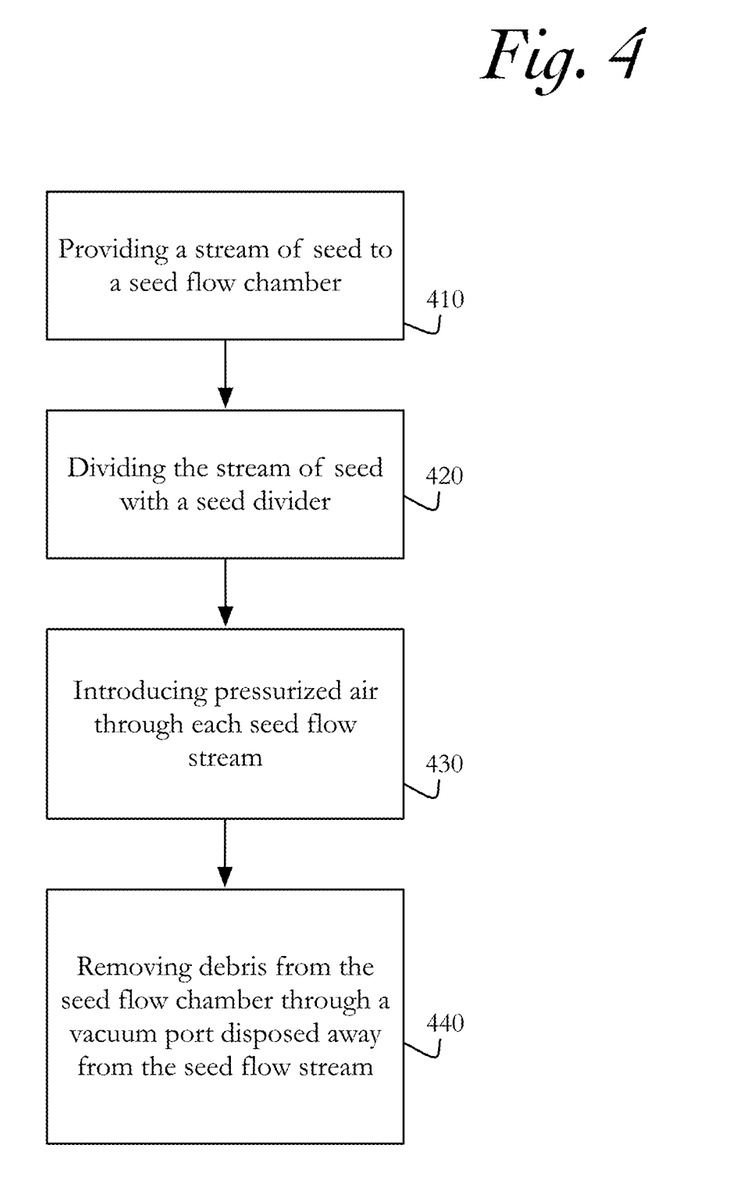
FIG. 4 is a flow chart of a seed conditioning process.

FIG. 4 shows steps of a seed conditioning process that can be used with the seed flow chamber 10 disclosed above. For context, the seed conditioning process takes place upstream of the seed treatment applicator. First, a stream of seed is provided into the seed flow chamber 10, as shown in Step 410. This seed flow stream could be provided by a hopper or bin disposed above the seed flow chamber 10. Alternatively, the seed flow stream could be provided by a seed conveyor or auger. Next, the stream of seed is divided with a seed divider 100, as shown in Step 420. Pressurized air is introduced through each seed flow stream, as the seed flow stream descends through the seed flow chamber 10, as shown in Step 430. The pressurized air removes dust and debris 170 from the seeds, as shown in Step 440. The dust and debris 170 are blown away from the seed flow stream toward the vacuum port 210, where the dust and debris 170 are removed from the seed flow chamber 10.

Figure 8:
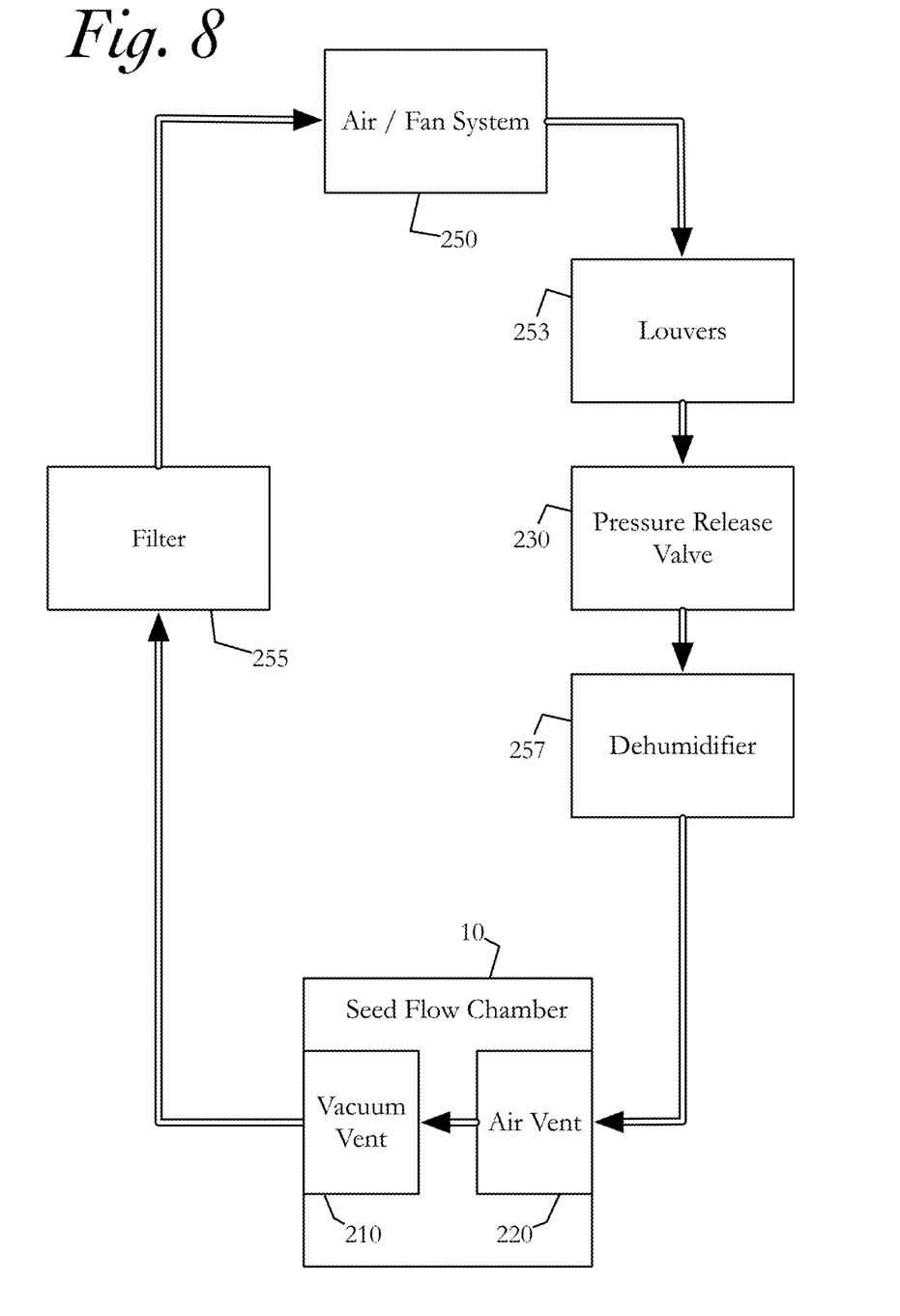
FIG. 8 is an air pressure flow chart.

The fan system 250 can introduce recycled air through the seed flow path through the seed deflector 150, 155. A potential advantage of the recycled air is the presence of a positive pressurized air source and a negative pressurized air source. The positive pressurized air blows the dust off of the seed. The negative pressurized air source—the vacuum—removes the dust and debris 170 from the seed flow chamber 10. By positioning the vacuum port 210 under the seed divider, as shown in FIG. 2, the seed flow stream flows around the vacuum port 210 and is not removed from the seed flow chamber 10 through the vacuum port. The recycled air is filtered and reintroduced into the seed treatment chamber as pressurized air. The dust and debris 170 is collected in a debris container 290. The air travels through a fan 255. Dampers or louvers 253 may be provided to regulate the volume of pressurized air. In one embodiment, the fan may have a air capacity of 200-1200 cubic feet of air per minute. Appropriate ductwork connects the filtering system 255 to the vacuum port 210 and the pressurized air port 220. In one embodiment, a pressurized air release or removal port 230 is provided to release approximately 10% of the filtered, pressurized air into the atmosphere, this is shown schematically in FIG. 8. Bleeding off a portion of the pressurized air creates a net vacuum pressure in the seed flow chamber 10. In this embodiment, 90% of the recycled, filtered, and pressurized air is introduced into the seed flow chamber 10. 10% off the pressurized, filtered air is released into the atmosphere. The fan system 250 includes appropriate pressure regulating mechanism—such as louvers or regulating valves (not shown)—for delivering an appropriate air pressure. The air pressure should be sufficient to discharge dust and debris 170 from the seed, without disrupting the seed flow through the seed flow chamber 10. The appropriate air pressure may depend on the size, shape, weight, and flow rate of the seed.

In another embodiment, the fan system 250 comprises a pressurized air generating component and a vacuum-generating component, where the components are distinct units. The pressurized air-generating component can be electric, pneumatic, mechanical, or other compressed air generators. The vacuum-generating component could be electric, pneumatic, mechanical, or other vacuum pump. As illustrated in FIG. 1, the fan system 250 comprises a singular fan unit 255 capable of generating the air supply and the vacuum source.

In another embodiment, the seed deflectors 150, 155 are arcuate, stepped, or disposed at various angles to promote efficient transfer of seed through the seed flow chamber 10 without seed damage or promoting residual seed remaining in the seed flow chamber 10. In another embodiment, the seed divider 100 is arcuate, U-shaped, or otherwise configured to divide the seed flow stream into multiple distinct flow streams. In another embodiment, the vacuum port 210 is disposed near the top of the seed flow chamber 10. In this configuration, the vacuum port 210 remains away from the seed flow path to prevent whole seeds from being removed through the vacuum port 210. In another embodiment, the seed flow chamber 10 is cylindrical or has a circular, hexagonal, octagonal, or similar cross section. In such embodiments, the vacuum port 210 is disposed away from the seed flow path and the pressurized air port 220 is disposed to introduce the pressurized air through the seed flow path.

The following are potential advantages of the seed conditioning system:
a. Removes dust and seed particulates, which prevents dust and debris plugging up of treating equipment or planting equipment;
b. Seed treatment is not applied to loose particulates, thereby preventing treated dust particles from entering the environment; and
c. Limits wasted seed treatment fluids.

Figure 5:
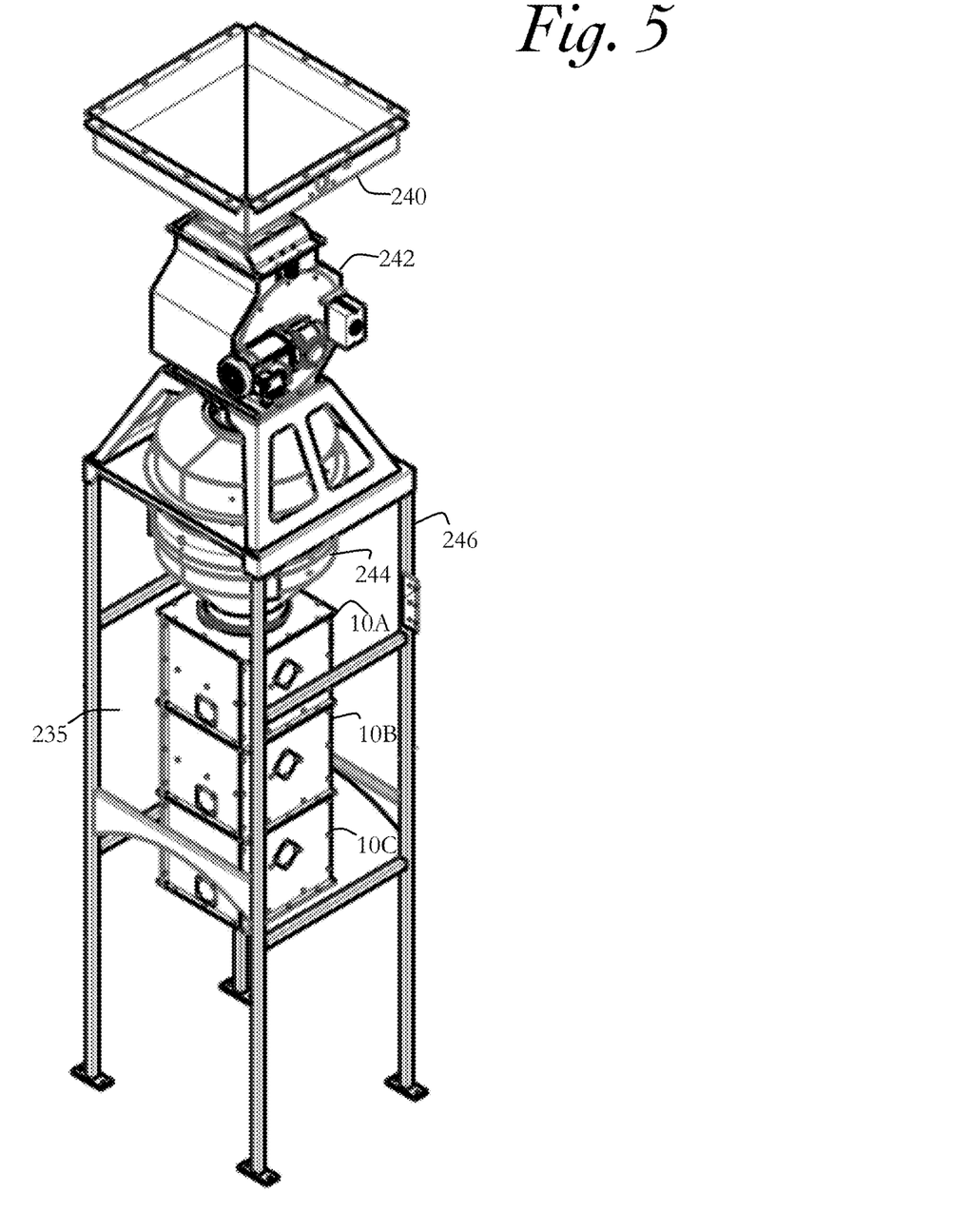
FIG. 5 depicts a topside perspective view of a vertically stacked, modular seed flow chamber configured as a seed processing system.

The seed flow chamber 10 can also be used as a seed processing system 235 for the mixing, polishing, and drying of freshly treated seed. In this operation, the seed flow chamber 10 is positioned downstream of the seed treatment applicator. FIG. 5 shows an embodiment of a seed processing system 235 containing three modular seed flow chambers 10A, B, C. The seed processing system is downstream of the seed source—such as a hopper 240. The seed processing system is also downstream of the seed metering device—such as a seed wheel 242. The seed processing system is also downstream of the seed treatment applicator 244. A frame 246 supports the vertically stacked hopper 240, seed wheel 242, seed treatment applicator 244, and seed processing system 235.

Figure 6:
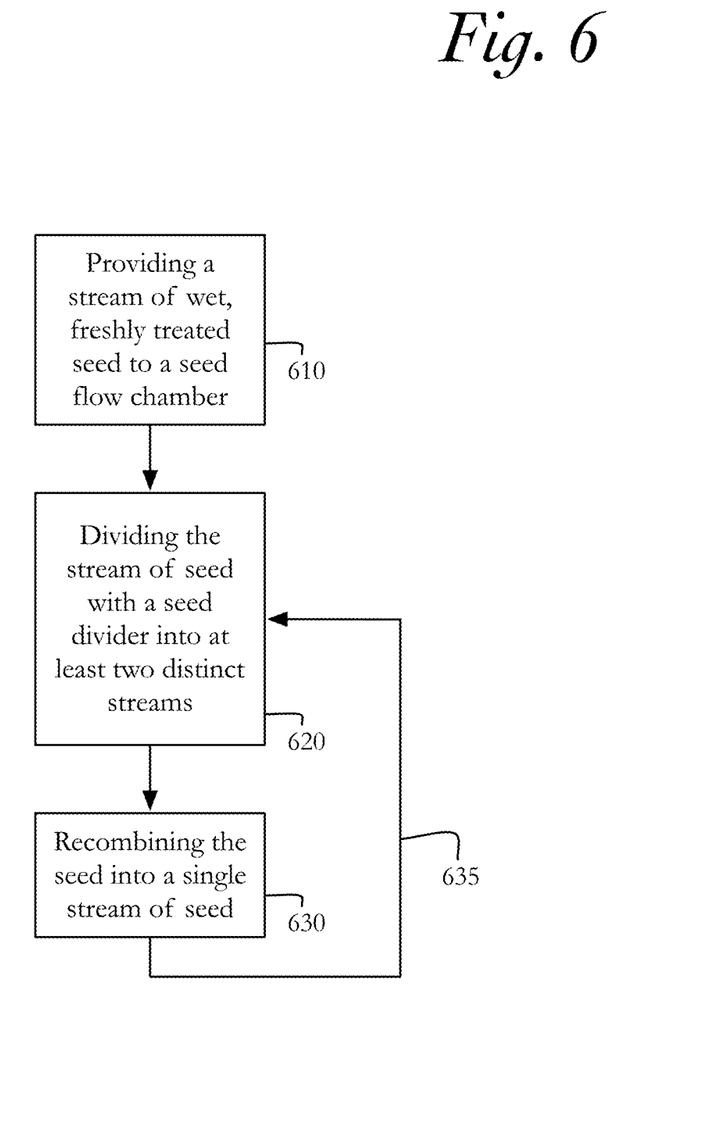
FIG. 6 is a flow chart of a seed processing system method.

FIG. 6 shows steps of a seed conditioning process that can be used with the seed flow chamber 10 disclosed above. First, a seed flow of wet, freshly treated seed is provided to the seed flow chamber 10, as shown in step 610. The single stream of seed 160 is divided into at least two distinct seed flow streams 165, as shown in step 620. Then the single flow of seed is recombined into a reunified seed flow stream 167, as shown in step 630. The process of dividing and reunifying is effective to rub the seeds together, to provide an even mixing and complete coating of the seed treatment fluid about the individual seeds.

As shown by arrow 635, the process of dividing and recombining the seed flow streams can be repeated a desired number of times. The embodiment of FIG. 5 shows three modular, vertically stacked seed flow chambers. Each modular flow chamber provides mixing through the dividing and recombining steps. The seed flow out of the seed discharge 20 of the first seed flow chamber 10A flows to the seed inlet 15 of the second seed flow chamber 10B.

The seed processing system decreases the energy requirements of a seed treatment system. In the embodiment of FIG. 5, the seed flows by gravity, undergoing the volumetric measuring in the seed wheel 242, treatment application in the seed treatment applicator 244, and then three drying and mixing cycles through the seed process system 235. The seed flows through all of these modules under the force of gravity.

The seed processing system 235 could be used to replace or supplement a mixing, drying drum. For example, the seed processing system 235 could be used with a drum that is physically shorter than standard mixing drying drums or with a drum that is configured to retain the seed for a shorter mixing and drying time. If used with a drum, the seed processing system could be used upstream or downstream of the mixing drum.

In another embodiment of the seed processing system 235, the hopper 240 is a weigh hopper and a variable rate knife gate is disposed below the hopper. In one embodiment of the seed processing system 235, one or more of the modules has a pressurized air port 220 for introducing conditioned air. In another embodiment, the seed processing system 235 has a vacuum port 210 and a pressurized air port 220 for managing the introduction of conditioned to make the drying cycle more efficient.

Potential advantages of the seed processing system include:
a. More energy efficiency compared with the use of a mixing drying drum;
b. The seed processing system takes up less square feet of floor space compared with a traditional mixing drying drum;
c. The total power requirement for the seed treatment system may be lower;
d. The seed processing system allows better air control, specifically allowing for the introduction and air flow management for using conditioned air.

Figure 7:
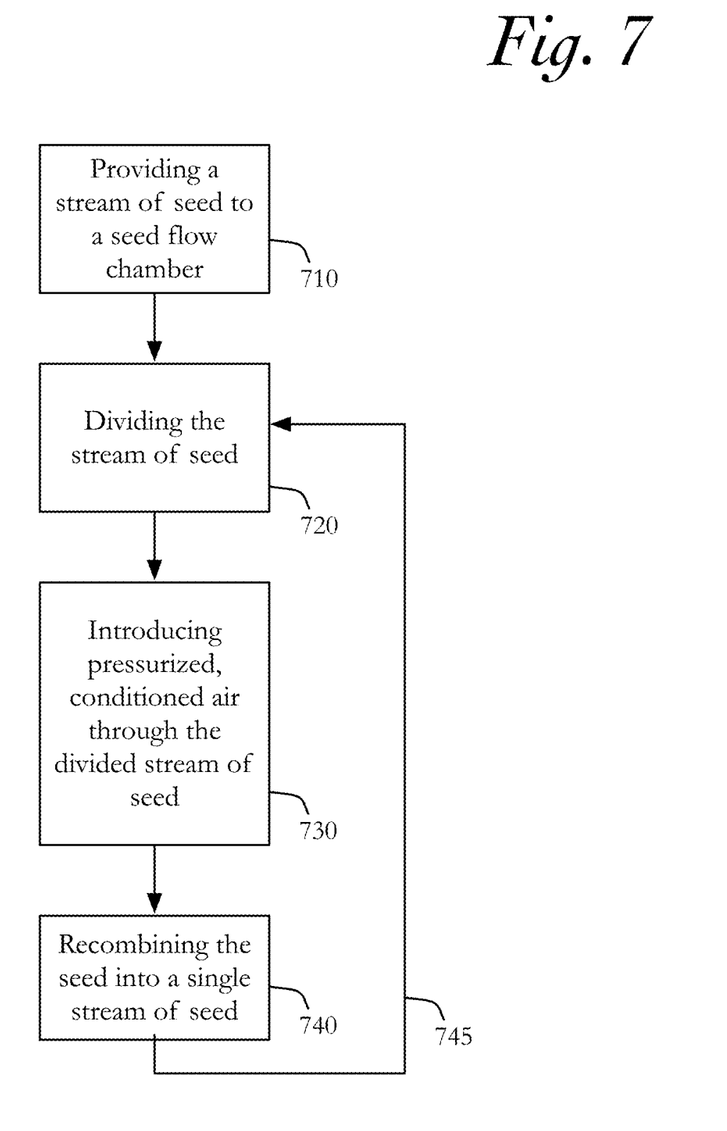
FIG. 7 is a flow chart of a seed drying system method.

The seed flow chamber 10 can also be used as a seed drying system. The seed drying system is located downstream of the seed processing system. A seed drying system process is shown in FIG. 7. First, a stream of seed is provided to a flow chamber, as shown in Step 710. Then the stream of seed is divided, as shown in Step 720. Pressurized, conditioned air is introduced through the divided stream of seed, as shown in Step 740. The pressurized, conditioned air can pass through a vented seed deflector 150, 155 in order to pass through the flow of seed. In one embodiment, the air flow path between the vented seed deflector 150, 155 and a vacuum source is approximately perpendicular to the seed flow path over the downward sloping seed deflector 150, 155. The pressurized, conditioned air can be provided to the seed flow chamber 10 through communication with the fan system 250. A dehumidifier 257 can be in communication with the air supply to provide conditioned air to the seed flow chamber 10, this is shown schematically in FIG. 8. If desired, the step of dividing the stream of seed, introducing pressurized, conditioned air through the divided stream of seed, and recombining the seed into a single stream of seed can be repeated, as shown in Step 745. Vertically stacking the modular seed flow chamber 10 would facilitate this step of repeating the drying process.

In one embodiment, the seed drying system comprises a plurality of seed flow chambers 10. In this embodiment, the seed flow chambers are vertically arranged such that seed flows under the force of gravity from the seed outlet opening 20 of a first seed flow chamber 10 into the seed inlet opening 15 of a second seed flow chamber 10. In this modular arrangement, any number of seed flow chambers 10 could be arranged. If desired, a conveyor could transport seed between a first vertical stack of seed flow chambers to a second vertical stack of seed flow chambers. The number of seed flow chambers through which the seed must pass is related to the seed retention time and will affect the amount of drying.

In one embodiment, the seed flow chamber 10 is an air flow chamber. The air flow chamber is a seed flow chamber 10 having an air port 220 and a vacuum port 210, as discussed above. The air may be directed through the converging surface, such as through the airflow apertures 159 of the seed deflectors 150, 155. The fan system 250 can be configured to recycle and filter the air to prevent chemical and dust from entering the atmosphere.

Advantages of the seed drying system may include:
a. More flowable seed, which less sticky before entering containers;
b. More complete drying;
c. Quieter operation than vibrator on a box;
d. Operation of the seed drying system may be complete in 35-40 seconds compared with up to 10 minutes with a staging hopper system.

Conditioned air can be produced by a dehumidifier, for example a compressor based dehumidifier having an evaporator coil. The dehumidifier can be integrated directly into the fan system 250 or be disposed within the air transportation ductwork.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

We claim:
1. A seed flow chamber comprising:
a. an upper inlet opening configured to receive a flow of seed;
b. a lower discharge opening;
c. a diverging guide member disposed below the upper inlet opening;
d. a converging guide member disposed below the diverging guide member, the converging guide member comprising:
i. a downward sloping surface;
ii. an air vent configured to communicate with an air supply;
e. a first vacuum vent configured to communicate with a vacuum source, the first vacuum vent disposed below the diverging guide member; and
f. a fan system configured to recirculate air between the air vent and the first vacuum vent.

2. The seed flow chamber of claim 1, wherein the air vent further comprises a plurality of apertures in the downward sloping surface.

3. The seed flow chamber of claim 1, wherein the fan system further comprises:
a. a dehumidifier configured to provide conditioned air in the air supply.

4. The seed flow chamber of claim 1, wherein the diverging guide member extends across a width of the seed flow chamber, the diverging guide member comprising:
a. a first end mounted to a first sidewall of the seed flow chamber; and
b. a second end mounted to a second sidewall of the seed flow chamber.

5. The seed flow chamber of claim 4, wherein the first vacuum vent is disposed in the first sidewall below and partially surrounded by the first end of the diverging guide member.

6. The seed flow chamber of claim 5, further comprising:
a. a second vacuum vent configured to communicate with the vacuum source, the second vacuum vent disposed in the second sidewall below and partially surrounded by the second end of the diverging guide member.

7. The seed flow chamber of claim 1, further comprising:
a. a first airflow path defined between the air vent and the first vacuum vent;
b. a downward seed flow path configured to direct seed falling under the force of gravity from the upper inlet opening, to the diverging guide member, to the converging guide member, and then to the lower discharge opening; and
c. wherein the first airflow path crosses the downward seed flow path at a generally perpendicular angle.

8. The seed flow chamber of claim 1, wherein the diverging guide member further comprises:
a. a top portion disposed directly below the upper inlet opening such that seed falling therethrough under the force of gravity falls from the upper inlet opening onto the top portion.

9. The seed flow chamber of claim 8, further comprising:
a. wherein the converging guide member further comprises:
i. a first guiding surface;
ii. a second guiding surface disposed opposite the first guiding surface;
b. wherein the diverging guide member further comprises:
i. a first bottom portion disposed above the first guiding surface; and
ii. a second bottom portion disposed above the second guiding surface.

10. The seed flow chamber of claim 9, further comprising:
a. a first plenum disposed below the first guiding surface and configured to communicate with the air supply and the air vent; and b. wherein the air vent comprises a plurality of perforations in the first guiding surface.

* * * * *